(12) United States Patent
Wittenberg et al.

(10) Patent No.: US 12,082,325 B1
(45) Date of Patent: Sep. 3, 2024

(54) METHODS AND APPARATUS FOR PROVIDING ILLUMINATION DURING OPERATION OF AN INDICIA READER

(71) Applicant: ZEBRA TECHNOLOGIES CORPORATION, Lincolnshire, IL (US)

(72) Inventors: Carl D. Wittenberg, Water Mill, NY (US); Jason S. Mak, Commack, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/204,277

(22) Filed: May 31, 2023

(51) Int. Cl.
| | |
|---|---|
| *H05B 47/125* | (2020.01) |
| *G06K 7/10* | (2006.01) |
| *G06T 7/70* | (2017.01) |
| *H04N 23/56* | (2023.01) |
| *H04N 23/74* | (2023.01) |

(52) U.S. Cl.
CPC ....... *H05B 47/125* (2020.01); *G06K 7/10732* (2013.01); *G06T 7/70* (2017.01); *H04N 23/56* (2023.01); *H04N 23/74* (2023.01)

(58) Field of Classification Search
CPC ...... H05B 47/125; H04N 23/73; H04N 23/56; G06T 7/70; G06K 7/10732
See application file for complete search history.

(56) References Cited

U.S. PATENT DOCUMENTS

| | | | |
|---|---|---|---|
| 2010/0147957 A1* | 6/2010 | Gurevich | G06K 7/10801 235/472.03 |
| 2016/0104019 A1* | 4/2016 | Todeschini | G06K 7/1426 235/472.01 |

* cited by examiner

*Primary Examiner* — Laura A Gudorf

(57) ABSTRACT

Devices, systems, and methods for providing illumination during operation of an indicia reader are described herein. An example system includes at least one imaging assembly; controller; and processor configured to: (a) initiate a ranging operation; (b) based on the ranging operation, determine a range value associated with a distance between the imaging assembly and an object in the field of view (FOV); (c) initiate a ramping operation comprising: (i) initiate a ramping sequence for the imaging assembly which captures plurality of images comprising image data of an environment appearing in the FOV using an associated plurality of focus parameters; and (ii) energizing an illumination assembly to provide illumination of the FOV during the ramping operation, the illumination intensity determined from the range value, the illumination intensity maintained substantially constant during at least a majority of the ramping operation; and (c) terminating the ramping operation based upon a termination signal.

20 Claims, 10 Drawing Sheets

350 ↘

| Illumination Source | Illumination Intensity | Zone | Zone Range (Inches) | | Range Value |
|---|---|---|---|---|---|
| | % | # | Min. | Max. | |
| Near Field LED | 10 | 15 | 0.0 | 10.0 | 15 |
| | 20 | 14 | 10.1 | 20.0 | 14 |
| | 30 | 13 | 20.1 | 30.0 | 13 |
| | 40 | 12 | 30.1 | 40.0 | 12 |
| | 50 | 11 | 40.1 | 50.0 | 11 |
| | 60 | 10 | 50.1 | 60.0 | 10 |
| | 70 | 9 | 60.1 | 70 | 9 |
| | 80 | 8 | 70.1 | 80.0 | 8 |
| | 90 | 7 | 80.1 | 90.0 | 7 |
| | 100 | 6 | 90.1 | 100.0 | 6 |
| Far Field LED | 20 | 5 | 100.1 | 110.0 | 5 |
| | 40 | 4 | 110.1 | 120.0 | 4 |
| | 60 | 3 | 120.1 | 130.0 | 3 |
| | 80 | 2 | 130.1 | 140.0 | 2 |
| | 100 | 1 | 140.1 | 150.0 | 1 |
| | 100 | 0 | 150.1 | Infinite | 0 |

FIG. 3C

METHODS AND APPARATUS FOR PROVIDING ILLUMINATION DURING OPERATION OF AN INDICIA READER

BACKGROUND

Barcode reading systems, such as a handheld indicia reader, may enter a ramping operation under certain circumstances, such as when unable to decode an indicia in image data or properly range the distance between the system and an object to be scanned, among others. During the ramping operation, the system may capture one or more images at varying focal distances since the distance between the object to be scanned and the system may be unknown or attempts to decode the indicia at known distances are unsuccessful. Ramping an imaging assembly of the system through varying levels of focus may result in an associated illumination assembly generating various levels of illumination intensity using one or more sources of illumination at each focal distance throughout the ramping operation. Accordingly, the ramping operation may result in inconsistent exposure of the captured images potentially inhibiting the system's ability to decode an indicia, thermal inefficiencies of the system based upon the power demands of the illumination assembly or other components throughout the ramping operation, as well as a flickering effect being generated by the illumination assembly which may be a nuisance to the system user. As such, a system that can reduce or eliminate the deleterious effects of existing ramping operations by providing more consistently image exposure, thermal efficiencies and consistent illumination during a ramping operation is desired.

SUMMARY

In an embodiment, a method for providing illumination during operation of an indicia reader is provided. The method includes: (a) initiating a ranging operation of an imaging assembly having a field of view; (b) based on the ranging operation, determining a range value associated with a distance between the imaging assembly and an object in the field of view; (c) initiating a ramping operation via a controller, the ramping operation comprising: (i) initiating a ramping sequence for the imaging assembly, wherein the imaging assembly captures a plurality of images comprising image data of an environment appearing in the field of view using an associated plurality of focus parameters; and (ii) energizing an illumination assembly to provide illumination of the field of view during the ramping operation, wherein an illumination intensity is determined based upon the range value and wherein the illumination intensity is maintained substantially constant during at least a majority of the ramping operation; and (d) terminating the ramping operation based upon the controller receiving a termination signal.

In a variation of the embodiment, the method further includes capturing, at least subsequent to determining the range value and prior to initiating the ramping operation, at least one image by the imaging assembly; and responsive to not successfully decoding an indicia contained within the at least one image by a decoding module, initiating the ramping operation.

In yet another variation of the embodiment, the at least one image captured by the imaging assembly subsequent to determining the range value and prior to initiating the ramping operation includes a first set of one or more images captured at a fixed focus position and a second set of multiple images captured at a bracketed set of focus positions around the fixed focus position.

In still yet another variation of the embodiment, the ranging operation includes: energizing an aiming light source configured to project an aiming light into the field of view; capturing, by the imaging assembly, one or more images comprising image data of the field of view containing the aiming light; analyzing a position of the aiming light in the one or more images to determine the range value; and storing the range value locally on a memory associated with the imaging assembly.

In a variation of the embodiment, the ranging operation includes retrieving a last known range value locally from a memory associated with the imaging assembly.

In yet another variation of the embodiment, the plurality of focus parameters include focus parameters defining a plurality of different focal zones, the ramping sequence generating image data at each of the plurality of focal zones.

In still yet another variation of the embodiment, the illumination assembly includes at least one near field illumination assembly and at least one far field illumination assembly.

In a variation of the embodiment, the plurality of focus parameters comprise focus parameters defining a first plurality of focal zones corresponding to the at least one near field illumination assembly and a second plurality of focal zones corresponding to the at least one far field illumination assembly, the ramping sequence generating image data at each of the plurality of focal zones and/or at each of the second plurality of focal zones.

In yet another variation of the embodiment, terminating the ramping operation based upon receiving the termination signal further includes providing the image data from at least one image of the plurality of images to a decoding module; analyzing the image data from the at least one image of the plurality of images by the decoding module to decode an indicia contained within the at least one image; and responsive to decoding the indicia contained within the at least one image, generating the termination signal to provide to the controller.

In another embodiment, a system for providing illumination during operation of an indicia reader. The system includes an imaging assembly having a field of view; a controller; one or more processors; and a memory associated with the particular indicia reader scanner storing instructions that, when executed by the one or more processors, cause the one or more processors to: (a) initiate a ranging operation; (b) based on the ranging operation, determine a range value associated with a distance between the imaging assembly and an object in the field of view; (c) initiate a ramping operation, wherein the ramping operation comprises the one or more processors configured to: (i) initiate a ramping sequence for the imaging assembly, wherein the imaging assembly captures a plurality of images comprising image data of an environment appearing in the field of view using an associated plurality of focus parameters; and (ii) energize an illumination assembly to provide illumination of the field of view during the ramping operation, wherein an illumination intensity is determined based upon the range value and wherein the illumination intensity is maintained substantially constant during at least a majority of the ramping operation; and (d) terminate the ramping operation based upon the controller receiving a termination signal.

In yet another embodiment, a tangible machine-readable medium including instructions that, when executed, cause a machine to at least: (a) initiate a ranging operation of an imaging assembly having a field of view; (b) based on the ranging operation, determine a range value associated with a distance between the imaging assembly and an object in the field of view; (c) initiate a ramping operation via a controller, the ramping operation causing the machine to at least: (i) initiate a ramping sequence for the imaging assembly, wherein the imaging assembly captures a plurality of images comprising image data of an environment appearing in the field of view using an associated plurality of focus parameters; and (ii) energize an illumination assembly to provide illumination of the field of view during the ramping operation, wherein an illumination intensity is determined based upon the range value and wherein the illumination intensity is maintained substantially constant during at least a majority of the ramping operation; and (d) terminate the ramping operation based upon the controller receiving a termination signal.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 3C illustrates an example look-up table for determining focus parameters and illumination parameters of an example imaging device, such as the example imaging device of FIG. 2;

Figure 1:
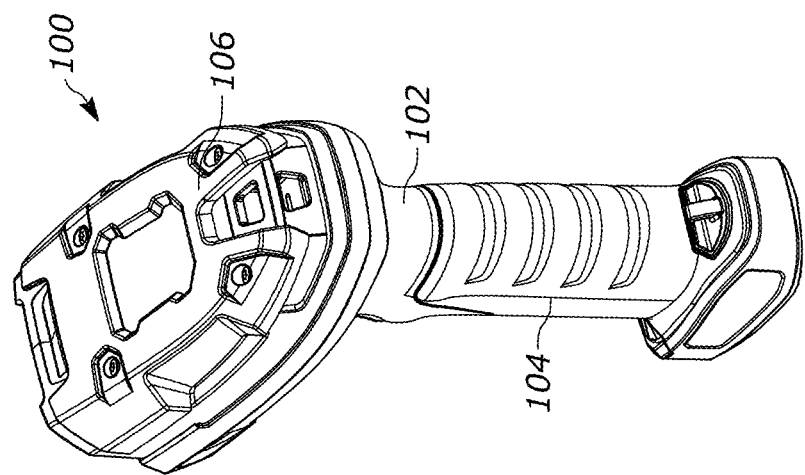
FIG. 1 illustrates a perspective front and back view of an example scanner in accordance with various embodiments.
Figure 1:
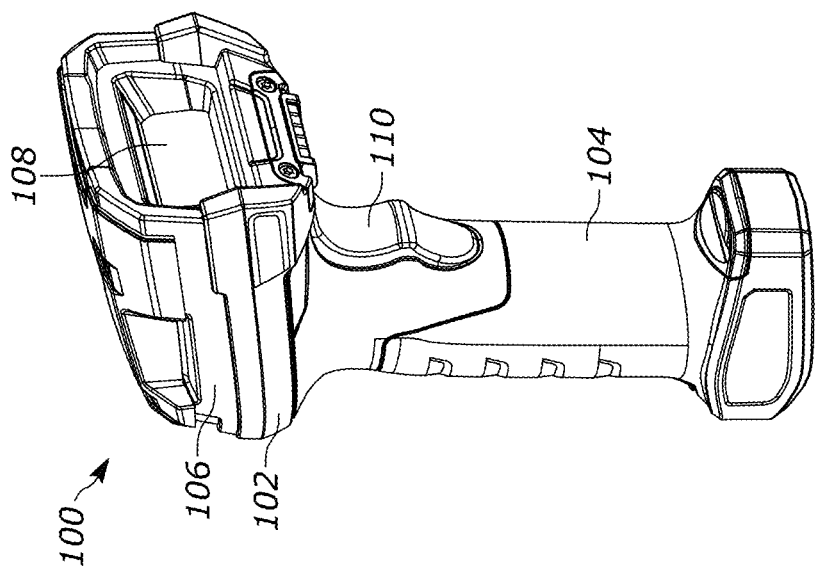

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

As previously mentioned, when entering a ramping operation, an indicia reader generally suffer from inefficient exposure, thermal inefficiencies and a generates a distracting flickering effect. Therefore, it is an objective of the present disclosure to provide systems and methods capable of barcode decoding which provide illumination of the FOV during the ramping operation based upon a range value associated with the distance between the indicia reader and an object to be scanned, wherein the illumination intensity is maintained substantially constant during at least a majority of the ramping operation. As a result, the indicia reader may operate more efficiently during a scanning session by eliminating overexposure of objects within the FOV which may decode barcodes in a more expedient manner, reducing time at checkout, provide more efficient thermal operating characteristics, and thus provide customers with a more efficient and enjoyable checkout experience.

Additionally, it should be understood that, the indicia and indicia scanning/decoding methods are referenced herein primarily as a barcode and barcode scanning/decoding for the purposes of discussion only. The systems and methods of the present disclosure may apply to any indicia (e.g., barcodes, quick response (QR) codes, a graphic, a logo, etc.) associated with an object.

Turning to the Figures, FIG. 1 illustrates an example indicia reader 100 having a housing 102 with a handle portion 104 and a head portion 106. The head portion 106 includes a window 108 and is configured to be positioned on the top of the handle portion 104. The head portion 106 includes an imaging lens (e.g., imaging lens 244 as described with regard to FIG. 2 below) that, depending on the implementation, is and/or includes a variable focus optical element.

The handle portion 104 is configured to be gripped by a reader user (not shown) and includes a trigger 110 for activation by the user. Optionally included in an embodiment is a base portion (not shown), which may be attached to the handle portion 104 opposite the head portion 106 and is configured to stand on a surface and support the housing 102 in a generally upright position. The indicia reader 100 may be used in a hands-free mode as a stationary workstation when it is placed on a countertop or other workstation surface. The indicia reader 100 may also be used in a handheld mode when it is picked up off the countertop or base station and held in an operator's hand. In the hands-free mode, products may be slid, swiped past, or presented to the window 108 for the reader to initiate barcode reading operations. In the handheld mode, the indicia reader 100 may be moved towards a barcode on a product, and the trigger 110 may be manually depressed or engaged to initiate imaging of the barcode.

Other implementations may provide only handheld or only hands-free configurations. In the embodiment of FIG. 1, the reader 100 is ergonomically configured for a user's hand as a gun-shaped housing 102, though other configurations may be utilized as understood by those of ordinary skill in the art. As shown, the lower handle 104 extends below and rearwardly away from the body 102 along a centroidal axis obliquely angled relative to a central FOV axis of a FOV of an imaging assembly within the scanning head 102.

Figure 2:
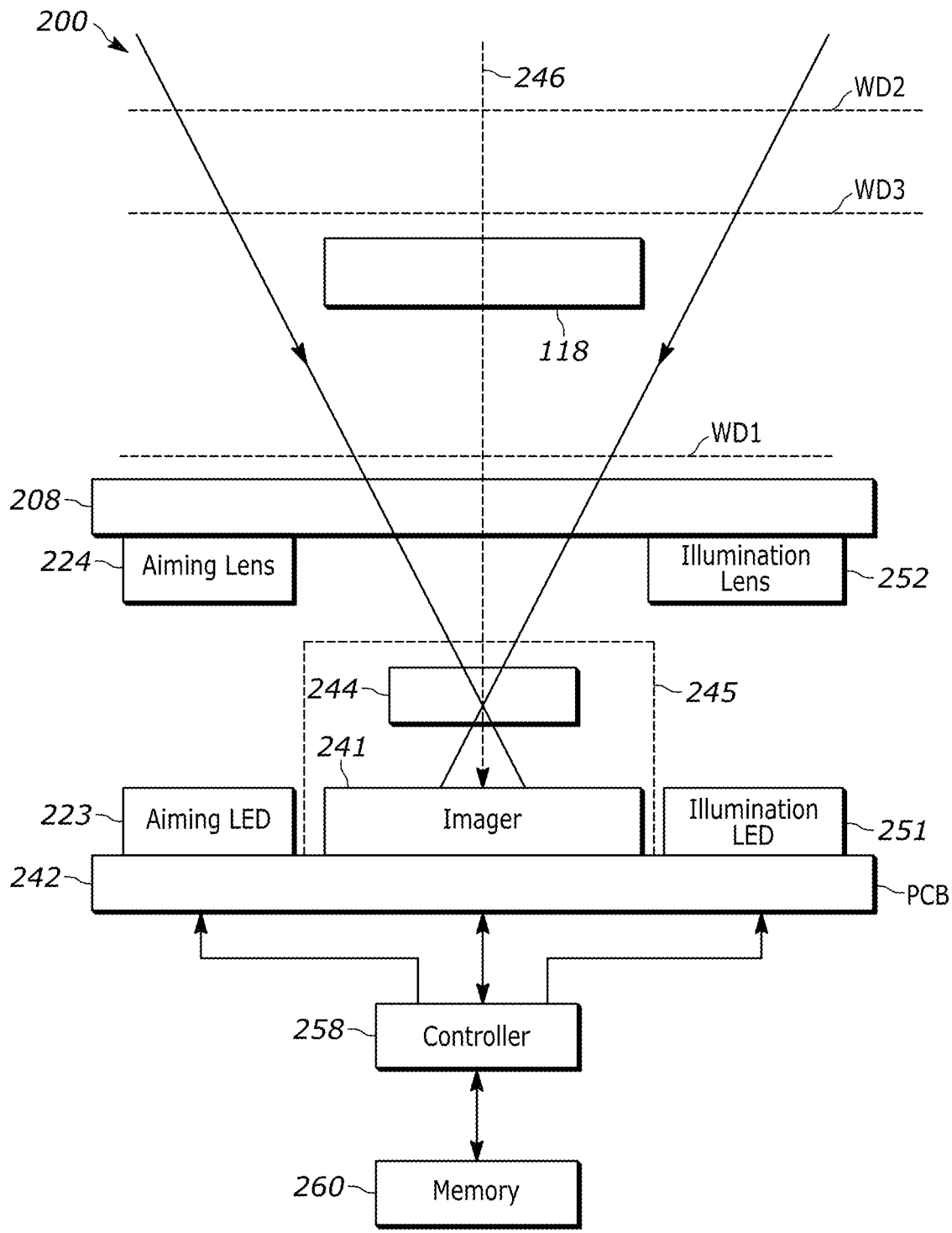
FIG. 2 illustrates a block diagram of an example imaging device such as the example scanner of FIG. 1.

Referring next to FIG. 2, a block diagram of an example architecture for an imaging device 200 such as handheld indicia reader 100 is shown. For at least some of the reader implementations, an imaging assembly 245 includes a light-detecting sensor or imager 241 operatively coupled to, or mounted on, a printed circuit board (PCB) 242 in the imaging device 200 as shown in FIG. 2. In an implementation, the imager 241 is a solid-state device, for example, a CCD or a CMOS imager, having a one-dimensional array of addressable image sensors or pixels arranged in a single row, or a two-dimensional array of addressable image sensors or pixels arranged in mutually orthogonal rows and columns, and operative for detecting return light captured by an imaging assembly 245 over a FOV along an imaging axis 246 through the window 208. The imager 241 may also include and/or function as a monochrome sensor and, in further implementations, a color sensor. It should be understood that the terms "imager", "image sensor", and "imaging sensor" are used interchangeably herein. Depending on the implementation, imager 241 may include a color sensor such as a vision camera in addition to and/or as an alternative to the monochrome sensor. In some implementations, the imager 241 is or includes a barcode reading module (e.g., a monochromatic imaging sensor). In further implementations, the imager 241 additionally or alternatively is or includes a vision camera (e.g., a color imaging sensor). It will be understood that, although imager 241 is depicted in FIG. 2 as a single block, that imager 241 may be multiple sensors spread out in different locations of imaging device 200.

The return light is scattered and/or reflected from an object 118 over the FOV. The imaging lens 244, which in at least some of the reader implementations is included in the imaging assembly 245, is operative for focusing the return light onto the array of image sensors to enable the object 118 to be imaged. In particular, the light that impinges on the pixels is sensed and the output of those pixels produce image data that is associated with the environment that appears within the FOV (which may include the object 118). This image data is typically processed by a controller (usually by being sent to a decoder) which identifies and decodes decodable indicia captured in the image data. Once the decode is performed successfully, the indicia reader may signal a successful "read" of the object 118 (e.g., a barcode). The object 118 may be located anywhere in a working range of distances between a close-in working distance (WD1) and a far-out working distance (WD2). In an implementation, WD1 is about one-half (0.5) inch from the window 208, and WD2 is about thirty (30) inches from the window 208.

In some implementations, the imaging lens 244 includes a variable focus optical element. In further implementations, the variable focus optical element is a lens operated and/or adjusted by a ball-bearing motor lens or a voice coil motor (VCM) actuator (i.e., a VCM lens). In implementations in which the variable focus optical element is a ball-bearing motor or VCM lens, the ball-bearing motor or VCM lens may have a focus range from one-half (0.5) inches extending infinitely (i.e., to optical infinity). In further embodiments, the variable focus optical element may be any lens or optical element with a similar capability to adjust focus, such as a liquid lens, a T-lens, a ball-bearing focusing actuator and any other similar lens known in the art. Depending on the implementation, the controller 258 may control the variable focus optical element.

An illumination assembly may also be mounted in, attached to, or associated with the imaging device 200. The illumination assembly includes an illumination light source 251, such as at least one light emitting diode (LED) or other suitable light source, and at least one illumination lens 252, and preferably a plurality of illumination and illumination lenses, configured to generate a substantially uniform distributed illumination pattern of illumination light on and along the object 118 to be imaged by image capture. At least part of the scattered and/or reflected return light is derived from the illumination pattern of light on and along the object 118.

Although FIG. 2 illustrates a single illumination source 251, it will be understood that the illumination light source 251 may include more illumination sources. In at least one implementation, the illumination light source 251 may include a near field illumination source, such as a near field LED, and a far field illumination source, such as a far field LED. The near field illumination source may suitable for illuminating objects nearer to the imaging device 200 (e.g., when capturing an image of the object 118, which may include an indicia for decoding) as compared to the far field illumination light source which may be a suitable illumination light source for illuminating the object 118 further from the imaging device 200. The illumination sources comprising the illumination light source 251 may be separately and non-simultaneously energized, simultaneously energized, or any combination thereof. In at least one implementation, the light sources of the illumination light source 251 may have different illumination capabilities, power levels or other illumination characteristics from one another. For example, the light sources may be different, e.g., one or more of infrared (IR), LED, organic LED (OLED), etc. In another example, the near field illumination light source may be capable of sufficiently illuminating the object 118 for imaging purposes (e.g., decoding a barcode) up to a certain distance from the imaging device 100 (e.g., in a zone between WD1 and WD3), whereas the far field illumination source may be capable of sufficiently illuminating the object 118 beyond the distance of the near field illumination LED for imaging purposes (e.g., in a zone between WD3 and WD2). In at least one implementation, the far field illumination source may provide illumination such that it may be less suitable and/or non-ideal for imaging the object 118 closer than a certain distance to the imaging device 200 (e.g., closer than WD3). For example, energizing the far field illumination source to illuminate the object 118 at certain distances may result in an over-exposure of the object 118 and/or indicia thereupon when captured in an image by the imaging device 200. Accordingly, one or more of the illumination light sources 251 may only be energized when the imaging device 200 images an object at a distance associated with certain range value for which an illumination light source 251 would be most appropriate. For example, continuing with the above example where WD1 is one-half (0.5) inch from the window 208, and WD2 is about thirty (30) inches from the window, the near field LED may be most appropriate for illuminating objects in a zone between one-half (0.5) inch up to ten (10) inches when capturing images for decoding, and the far field LED may be most appropriate one for illuminating objects in a zone more than ten (10) inches and up to thirty (30) inches when capturing images for decoding. Illuminating the object 118 using the most appropriate illumination source 251 may provide improved exposure of the object/indicia in the captured images.

In at least one implementation, the power level of the one or more illumination light sources 251 may be variable, e.g., using one or more of a duration of an electrical pulse, or variable current during a duty cycle, which powers the illumination light source 251. In some implementations, adjusting and/or varying the power level of the illumination light source 251 may correspondingly vary the illumination intensity of the associated illumination source. For example, operating an LED at full power may provide a higher illumination intensity then operating at half power. Accordingly, to further optimize illuminating the object 118 and/or the exposure level of an image of the object 118, one or more of the light sources 251 may be energized at specific intensities when the imaging device 200 images the object 118 based upon the distance between the imaging device 200 and the object 118. In some implementations, the distance may be represented by an associated range value. Certain range values may provide for energizing a specific illumination source at a specific illumination intensity, i.e., illumination parameters, which may further improve exposure of the object 118 and/or indicia in the captured images.

An aiming light assembly may also be mounted in, attached to, or associated with the imaging device 200 and preferably includes an aiming light source 223, e.g., one or more aiming LEDs and/or laser light sources, and an aiming lens 224 for generating and directing a visible aiming light beam away from the imaging device 200 onto the object 118 in the direction of the FOV of the imager 241.

Further, the imager 241, the illumination light source 251, and the aiming light source 223 may be operatively connected to a programmed microprocessor or controller 258 operative for controlling the operation of these components. In some implementations, the controller 258 is or includes an imaging processor as described herein. In further implementations, the controller 258 functions as, or is communicatively coupled to, an imaging processor for receiving, processing, and/or analyzing the image data captured by the imagers. For example, in one embodiment, the imaging device 200 includes an indicia decoder (e.g., such as a barcode scanner) in communication with the imager 241, and configured to receive the image data, locate and/or decode one or more indicia captured in the image data.

A memory 260 is connected and accessible to the controller 258. Preferably, the controller 258 is the same as the one used for processing the captured return light from the illuminated object 118 to obtain data related to the object 118. Though not shown, additional optical elements, such as collimators, lenses, apertures, compartment walls, etc. may be provided in the housing. Although FIG. 2 shows the imager 241, the illumination light source 251, and the aiming light source 223 as being mounted on the same PCB 242, it should be understood that different implementations of the imaging device 200 may have these components each on a separate PCB, or in different combinations on separate PCBs. For example, in an implementation of the imaging device 200, the illumination LED source 251 is provided as an off-axis illumination (i.e., has a central illumination axis that is not parallel to the central FOV axis).

In some implementations, the object 118 is, or includes, an indicia for decoding (e.g., a decode indicia), such as a barcode, a QR code, a label, a UPC code, a digital matrix code, logo, image, etc. In further implementations, the object 118 is or includes a digital watermark, the digital watermark may include a plurality of repeating barcodes, product codes, code patterns, or other such indicia that comprise the digital watermark. In some such implementations, the digital watermark is invisible or near-invisible to the human eye but is able to be detected and/or imaged by an imaging device 200.

Figure 3A:
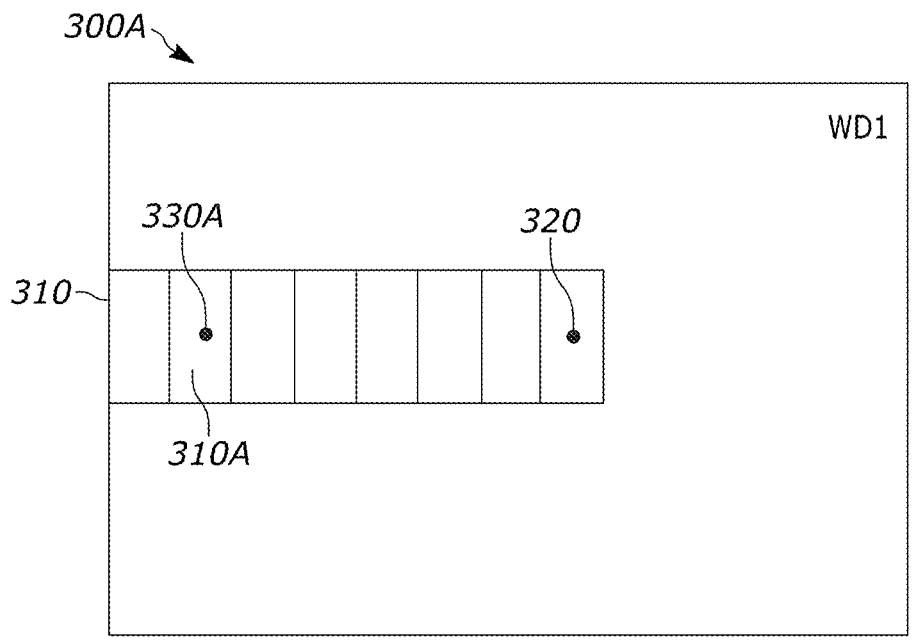
FIG. 3A illustrates an example aiming pattern on an object located at a close-in distance from an example imaging device, such as the example imaging device of FIG. 2.
Figure 3B:
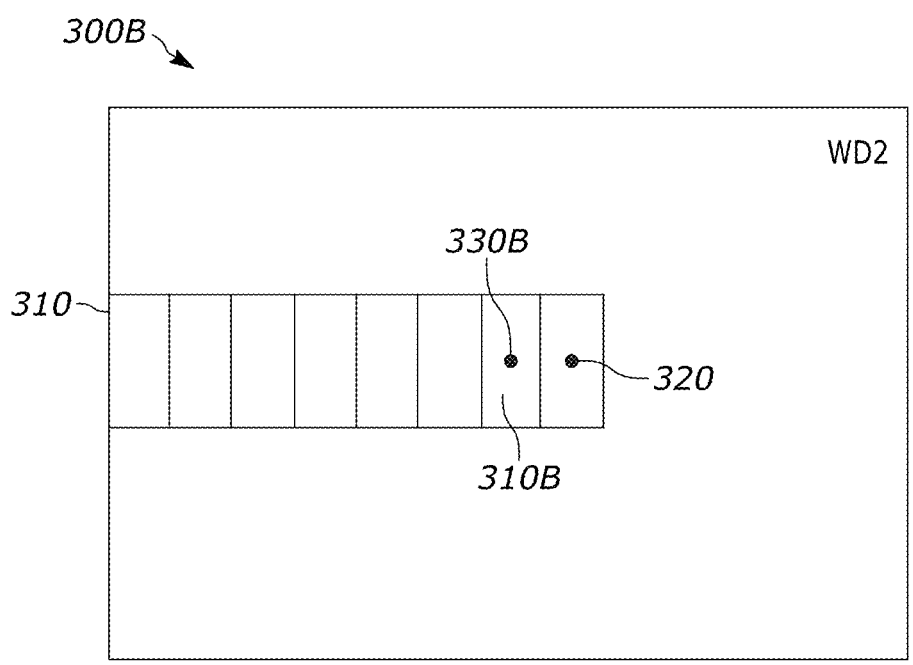
FIG. 3B illustrates an example aiming pattern on an object located at a far-out distance from an example imaging device, such as the example imaging device of FIG. 2.

FIGS. 3A and 3B illustrate aim patterns 330A, 330B in a close-in FOV 300A and far-out FOV at a close-in working distance (WD1) and a far-out working distance (WD2), respectively. In particular, an imaging device 200 determines (e.g., via a controller such as controller 258 or imaging processor of imaging assembly 245) a distance between a center point 320 and an aiming pattern 330A and 330B (e.g., as projected by an aiming module such as aiming LED 223 and aiming lens 224) to determine a distance between the imaging device 200 and the object being imaged, such as object 118.

In particular, the FOVs 300A and 300B are divided into an equal number of imaging regions 310. It will be understood that, although the exemplary embodiments of FIGS. 3A and 3B depict eight imaging regions 310 of equal size, that the imaging device 200 may, depending on the embodiment, divide the FOVs 300A and 300B into four regions, sixteen regions, thirty-two regions, etc. Similarly, the imaging regions 310 may be of different shapes and/or sizes.

Based on which region the aiming pattern 330A and/or 330B falls into, the imaging device 200 determines a distance between the imaging device 200 and the object, the distance having an associated range value. For example, in the exemplary embodiment of FIG. 3A, the imaging device 200 determines that the aim pattern 330A is in a second region 310A (e.g., six regions away from the center 320 (e.g., according to the imaging axis 246)), and subsequently determines that the object is at a distance of WD1, e.g., one-half (0.5) inch, one (1) inch, two (2) inches, etc. Similarly, in the exemplary embodiment of FIG. 3B, the imaging device 200 determines that the aim pattern 330B is in a seventh region 310B (e.g., one region away from the center 320), and subsequently determines that the object is at distance of WD2 (e.g., thirty-two (32) inches, forty (40) inches, forty-eight (48) inches, etc.), which also has an associated range value. As such, the imaging device 200 uses parallax techniques to determine a distance and associated range value between the imaging system and the object to be scanned.

In some implementations, the distances and their associated range values may be stored in memory, for example as a look-up table (LUT) in memory 260 as illustrated by LUT 350 of FIG. 3C. When the distance between the imaging device 200 and object is known, the system, e.g., via the controller such as controller 258, an imaging processor, or other suitable device and/or component, may access the LUT 350 and retrieve the associated range value based on the known distance. The range value may be stored and/or retrieved in a memory, such as memory 260, by the imaging device 200 at one or more times, such as proximate conducting a ranging operation, a ramping operation or a decode operation. For example, a successful range operation detects the distance between an object and the imaging device 200 is fifty-five (55) inches and according to the LUT entry 355, falls between the zone range spanning fifty and one-tenth (50.1) inches to sixty (60) inches and has a corresponding range value often (10). While in this example the range value is shown to have the same value as the zone, this is for illustration purposes only. In other implementations, the range value may be the same value as the distance, an arbitrary value associated with the distance, or any other suitable value. Additionally, while FIG. 3C illustrates zone, zone range/distance and range value information, among other information, as a LUT, the information may be stored in any other data suitable data structure, including but not limited to the calibration table, a list, a database, etc. Furthermore, the quantity and values in the rows and columns of LUT 350 are for illustration purposes only. In other implementations, the LUT 350 may include more, less, and/or a different quantity of rows and/or columns and may include different values. For example, the LUT may include 25 zones, with each zone range covering a span of eighteen (18) inches.

In some examples, the imaging device 200 is calibrated during manufacture to accommodate, possibly among other tolerances, a tolerance in the separation between the imager 241 and the aiming light source 223 and/or a tolerance in an optical alignment of the imager 241 and the aiming light source 223. Such manufacturing tolerances affect the amount of and/or the geometry of parallax between the imager 241 and the aiming light source 223. Accordingly, the imaging device 200 stores a calibration table (e.g., in memory 260) representing the focal zones or, equivalently, each respective ones of a finite plurality of fixed focus distances which comprise focal zone. The calibration table may also store other information, such as illumination parameters and/or focus parameters associated with one or more focus distances, focal zones, and/or range values, as further described herein.

In some examples, an aiming pattern 330A and/or 330B is detected and an imaging region is identified when a total brightness difference satisfies a pre-determined threshold. When an aiming pattern 330A and/or 330B is not, thus, detected (e.g., which may result in the distance and/or range value to the object being unknown to the imaging device 200), the imaging device 200 may enter a ramping operation in which the imaging assembly sequentially attempts to capture and decode an indicia using a finite sequence of fixed focus distances or positions. One or more focus distances may comprise a focal zone. For example, returning to the LUT 350 of FIG. 3C, the zone column 357 indicates sixteen (16) zones numbered zero (0) to fifteen (15). Each zone includes a zone range spanning approximately ten (10) inches, whereby the fifteen (15) zones collectively cover a range of one hundred fifty (150 inches), as well as one zone (i.e., zone zero) includes beyond one hundred fifty (150) inches.

In some implementations, each focal zone may have associated focus parameters, such as a focal distance/focal length, frame rate, exposure, aperture, shutter speed, ISO, and/or any other suitable parameters which may affect the capturing an image by the imaging device 200. For example, upon determining a distance (e.g., from a ranging operation), the controller such as controller 258, imaging processor, or any other suitable component, may determine from the LUT 350 a range value and/or zone associated with the distance, and send a signal, instruction or other indication to the imaging assembly 245, imaging processor or other suitable component, with focus parameters associated with the range value and/or zone. The imaging assembly, e.g., via the imager 241 and imaging lens 244, may capture one or more images using the focus parameters, e.g., which may provide a "clear" image of the object and indicia located there upon for decoding based on the object's distance. In some implementations, the focus parameters may be stored in the LUT 350, the calibration table, a list, a database and/or other suitable data structure, and further may be stored in a local memory such as local memory 260. The information provided in the LUT 350 is for exemplary purposes only, and as described earlier, may vary in other implementations.

In some implementation, the imaging device 200 may illuminate the FOV when one more images are being captured, such as for subsequent decoding of an indicia located within the one images. The illumination light source 251 maybe energized, e.g., by a controller such as controller 258, proximate capturing one or more images by the imaging assembly 245. In some implementations, the illumination the illumination light source provides may remain substantially constant across the FOV when capturing one or more images, such as during at least a majority of a ramping operation. The system (e.g., indicia reader 100, imaging device 200) may determine an illumination light source and associated illumination intensity (i.e., illumination parameters) based upon the distance between the imaging device 200 (or indicia reader 100) and the object, e.g., as determined during a ranging operation and based on a range value, a focus parameter, of other suitable information. Returning to the previous example, a ranging operation may determine an object is fifty-five (55) inches from the imaging device 200 and accordingly is located in zone ten (10) having a range value of ten (10) per the LUT entry 355. The LUT entry 355 further indicates the illumination source 251 associated with this distance, zone, and/or range value is the near field LED such as the near field LED described in FIG. 2, the near field LED also having an associated illumination intensity of sixty percent (60%). Proximate an image capture operation of the object 115 at fifty-five (55) inches away from the imaging device 200, the controller 258 may send a signal to the illumination light source 251 to energize the near field LED at an illumination intensity of sixty percent (60%). In some implementations, the illumination source and/or illumination intensity information may be stored in the LUT 350, the calibration table, a list, a database and/or other suitable data structure, and further may be stored in a local memory such as local memory 260. The information provided in the LUT 350 is for exemplary purposes only, and as described earlier, may vary in other implementations.

When conducting a ramping operation, such as when a distance cannot be determined during a ranging operation, an indicia cannot be decoded from an image capture operation, or any other suitable scenario, the system (e.g., indicia reader 100, imaging device 200, etc.) may enter a ramping operation, successively capturing one or more images at one or more associated focal zones. In some implementations, the ramping operation may include at each focal zone, the imaging device 200 carrying out the following steps: (i) setting the imaging assembly to the focus parameters associated with the focal zone, object distance and/or range value (e.g., according to LUT 350); (ii) energizing (or keeping energized) the illumination light source 251 according to illumination parameters associated with the focal zone, object distance and/or range value (e.g., according to LUT 350); (iii) capturing one or more images; and (iv) attempting a decode operation to decode an indicia within the one or more images. If the decode operation is successful, the ramping operation may end. If a decode is not successfully, the ramping operation may repeat the aforementioned steps for another focal zone, as part of a ramping sequence. The ramping sequence may include moving through the successive focal zones in an incremental manner. This may include successively ramping up or ramping down through all the focal zones during the ramping sequence, i.e., moving from focal zone fifteen (15), then to focal zone fourteen (14), then to focal zone thirteen (13), etc., eventually down to zone zero (0) if the ramping sequence is not ended, and then ramping in the other direction, i.e., moving from focal zone zero (0), then to focal zone one (1), then to focal zone two (2), etc., and so on. The ramping operation may come to an end when a successful decode of an indicia in the captured image data occurs, when the user of the system ends the scanning operation, e.g., by releasing the trigger of an indicia reader, if a system fault or loss of power occurs, or in any other suitable manner.

In at least some implementations, the system (e.g., indicia reader 100, imaging device 200) may capture one or more images using focus parameters associated with a single object distance and/or focus distance within a single focal zone, i.e., during a fixed focused image capture operation. For example, the imaging device 200 may successively capture eight images of the object 118 at a distance of thirty (30) inches. The one or more images captured at the fixed focus distance may all use the same focus parameters and illumination parameters, e.g., those indicated by LUT 350, the calibration table, etc.

In at least some implementations, the system (e.g., indicia reader 100, imaging device 200) may capture one or more images using multiple object distances and/or multiple focus distances within a single focal zone, i.e., during a bracketing focused image capture operation. The multiple focus distances may include a series of successive focus distances proximate one another and within a single focal zone. For example, for a focus distance of (thirty) 30 inches, the focal zone may span twenty-six (26) inches through thirty-four (34) inches. During the bracketing operation for a focus distance of (thirty) 30 inches, of the imaging device 200 may successively capture a series of six (6) images of the object 118, with one image each captured at focus distances of twenty-six (26) inches, twenty-eight (28) inches, thirty (30) inches, thirty-two (32) inches, and thirty-four (34) inches, all within the focal zone spanning twenty-six (26) inches through thirty-four (34) inches associated with the thirty (30) inch focus distance. The one or more images captured at the fixed focus distance may each use the focus parameters and illumination parameters associated with their respective focus distances, e.g., those indicated by LUT 350, the calibration table, etc. The values provided in the bracketing focus image capture operation example are for illustration purposes only. For example, the number of images captured, focus distances and/or other parameters may be different in other examples and/or implementations.

Unlike the fixed focus image capture operation and/or bracketing focus image capture operation, the ramping operation may include capturing images across more than one focal zone. As different illumination parameters may be associated with different focal zones, traversing multiple focal zones during a ramping operation may include energizing the illumination assembly, such as the near field LED and far field LED of illumination light source 251, with different illumination parameters (e.g., which light source to energize and at what illumination intensity) at each focal zone during the ramping operation. This may result in the thermal inefficiencies for the illumination assembly or other components when cycling through multiple illumination parameters, image exposure instability when capturing images using one or more illumination parameters which may affect the ability to successfully decode an indicia within the image data of the images, and/or cause the user of the indicia reader or imaging device to experience a flickering effect generated by the illumination assembly when cycling through multiple illumination parameters, which may be distracting or otherwise create an unideal user experience. Because of this and to mitigate if not eliminate such inadequacies, when carrying out a ramping operation, the system (e.g., indicia reader 100, imaging device 200, etc.) may only use a single illumination parameter throughout at least a majority of the ramping operation.

The illumination assembly may illuminate the FOV during the ramping operation with an illumination intensity which is maintained substantially constant during at least a majority of the ramping operation. For example, the controller such as controller 258, may issue an instruction, command, signal, or other indication to the illumination assembly to energize the illumination source, e.g., only the near field light source or the far field light source, with a full power illumination intensity during the majority, if not the entire, ramping operation. In some implementations the range value is used to determine at least some of the illumination parameters during the ramping operation, such as determining the illumination light source (e.g., illumination light source 251) if more than one, and/or the illumination intensity of the light source. The system may determine the range value during one or more ranging operations. The system may retrieve the range value from memory, for example when one or more subsequent ranging operations do not result in a consistent range value, e.g., the range value changes between ranging operation, or when the ranging operation does not result in any range value, e.g., when the distance to an object cannot be determined, such as when the user of an indicia reader moves the reader through the ranging operation while engaging the trigger, resulting in the inability to establish a distance during a ranging operation. In some implementations, the range value in memory, such as memory 260, is a range value saved during a previous ranging operation and may be the last known range value of the system.

Figure 4A:
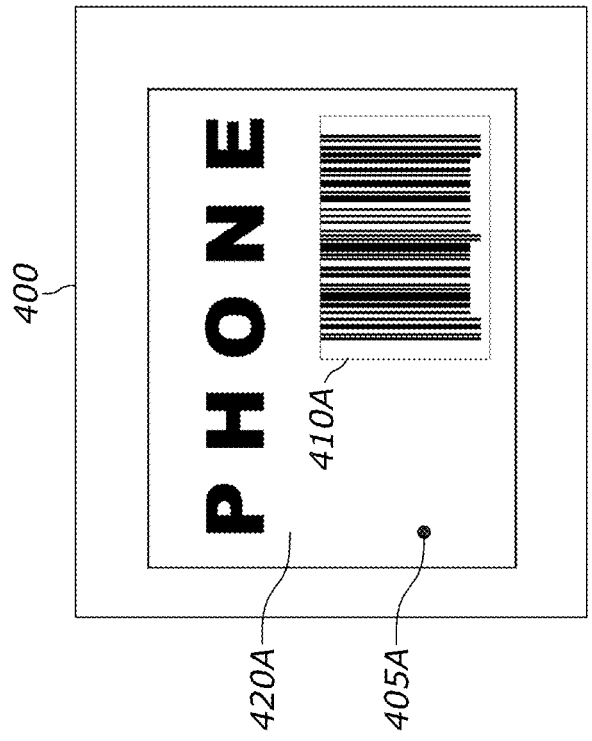
FIG. 4A illustrates an example field of view (FOV) in which an example imaging device aims an aiming pattern onto an object and focuses on the object.
Figure 4A:
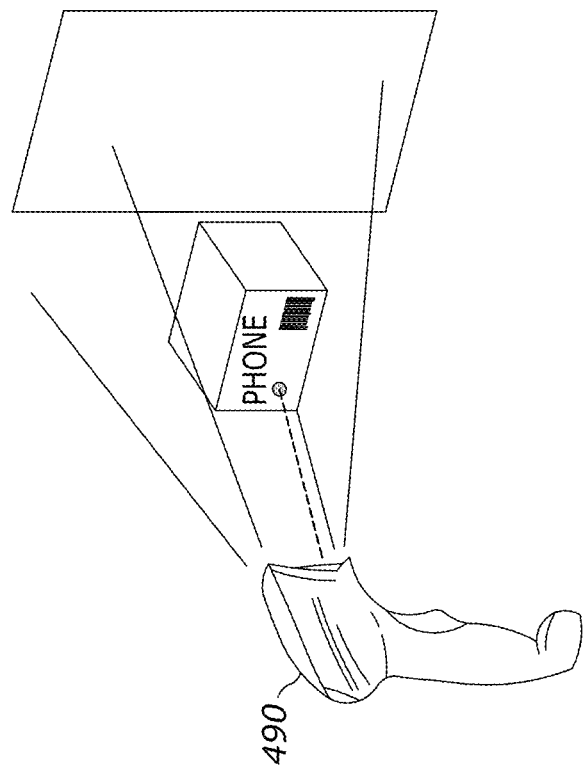
Figure 4B:
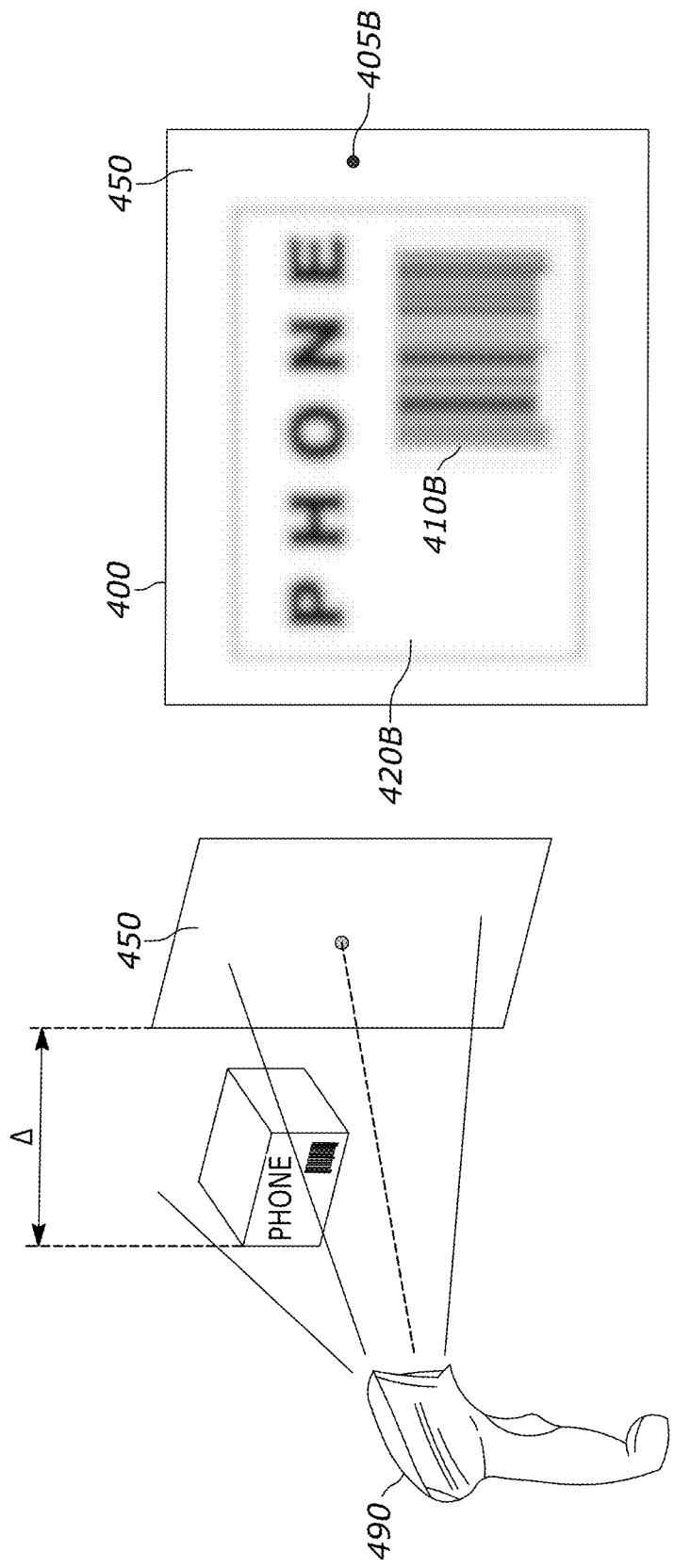
FIG. 4B illustrates an example FOV in which an example imaging device aims an aiming pattern beyond an object, causing images of the object to be blurry.

Referring next to FIGS. 4A and 4B, an imaging device 490 (e.g., indicia reader 100, imaging device 200, etc.) focuses to capture images of a FOV 400. In particular, FIG. 4A depicts an embodiment in which the imaging device 490 properly aims an aiming pattern 405A onto an object 420A, and the imaging device 490 focuses on the object 420A. As such, the object 420A and a decode indicia 410A associated with the object 420A are focused (e.g., clear) in the image of the FOV 400.

FIG. 4B, however, depicts an embodiment in which the imaging device 490 aims an aiming pattern 405B past the object 420B, and instead the imaging device 490 focuses on a second object 450 (e.g., a wall) a distance A away from the object 420B. As such, the object 420B and a decode indicia 410B associated with the object 420B appear out-of-focus (e.g., blurry) in an image of the FOV 400.

In some implementations, the inability to decode an indicia may result in the system (e.g., indicia reader 100, imaging device 200) entering a ramping operation, in which the system attempts to obtain focused, clear images of an object and associated indicia to successfully decode. The system may carry out one or more fixed focus image capture operations and/or bracketing focus image capture operations subsequent to the ramping operation if neither the fixed focus operation nor bracketing focus operation results in a successful decode. In other implementations, the system may initiate a ramping operation without having carried out a fixed focus image capture operations and/or bracketing focus image capture operation, for example when a distance cannot be determined from a ranging operation, as described herein.

Figure 5:
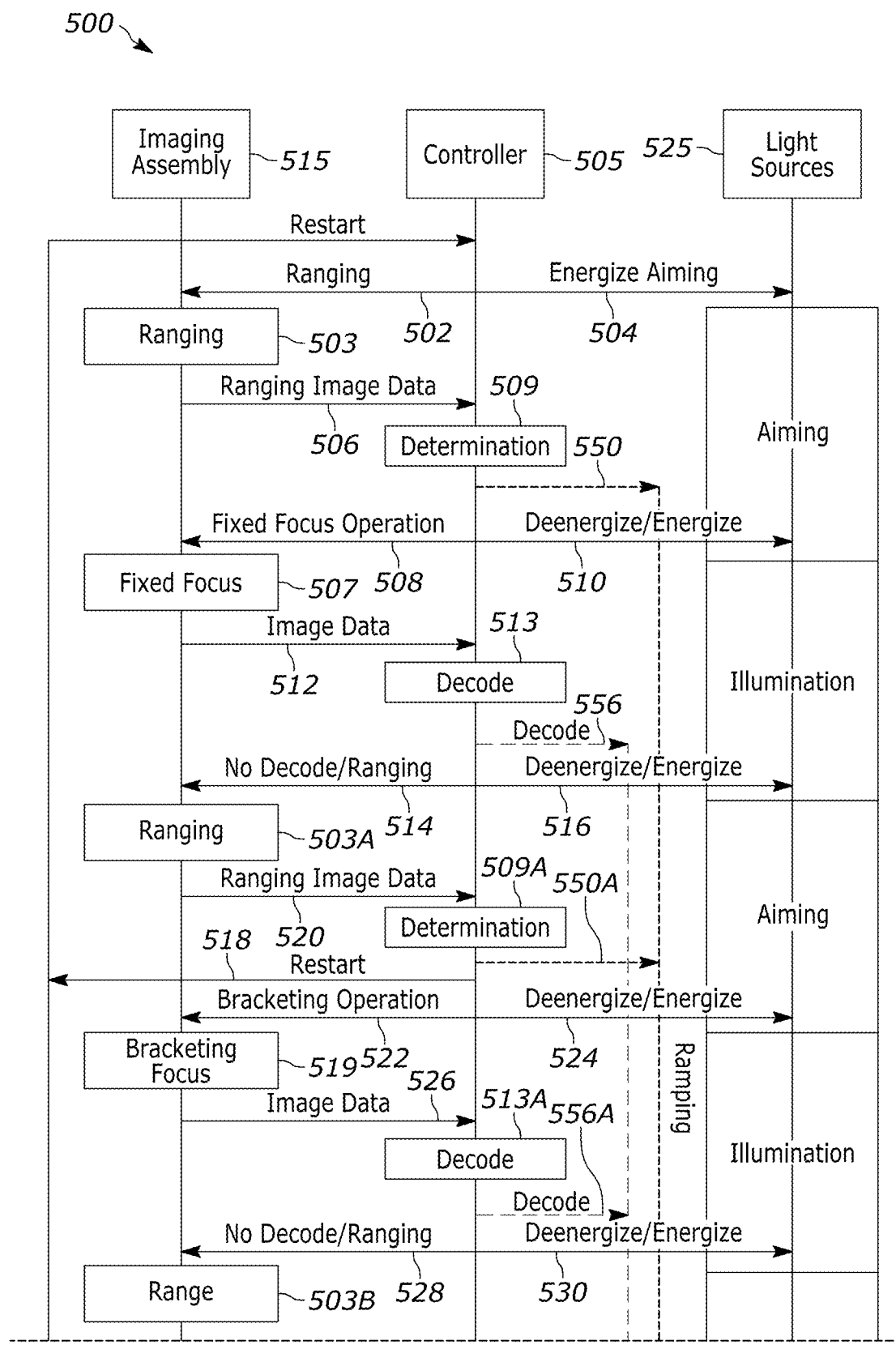
FIG. 5 illustrates a signal diagram of an example scenario for providing illumination during operation of an indicia reader according to the techniques described herein.
Figure 5:
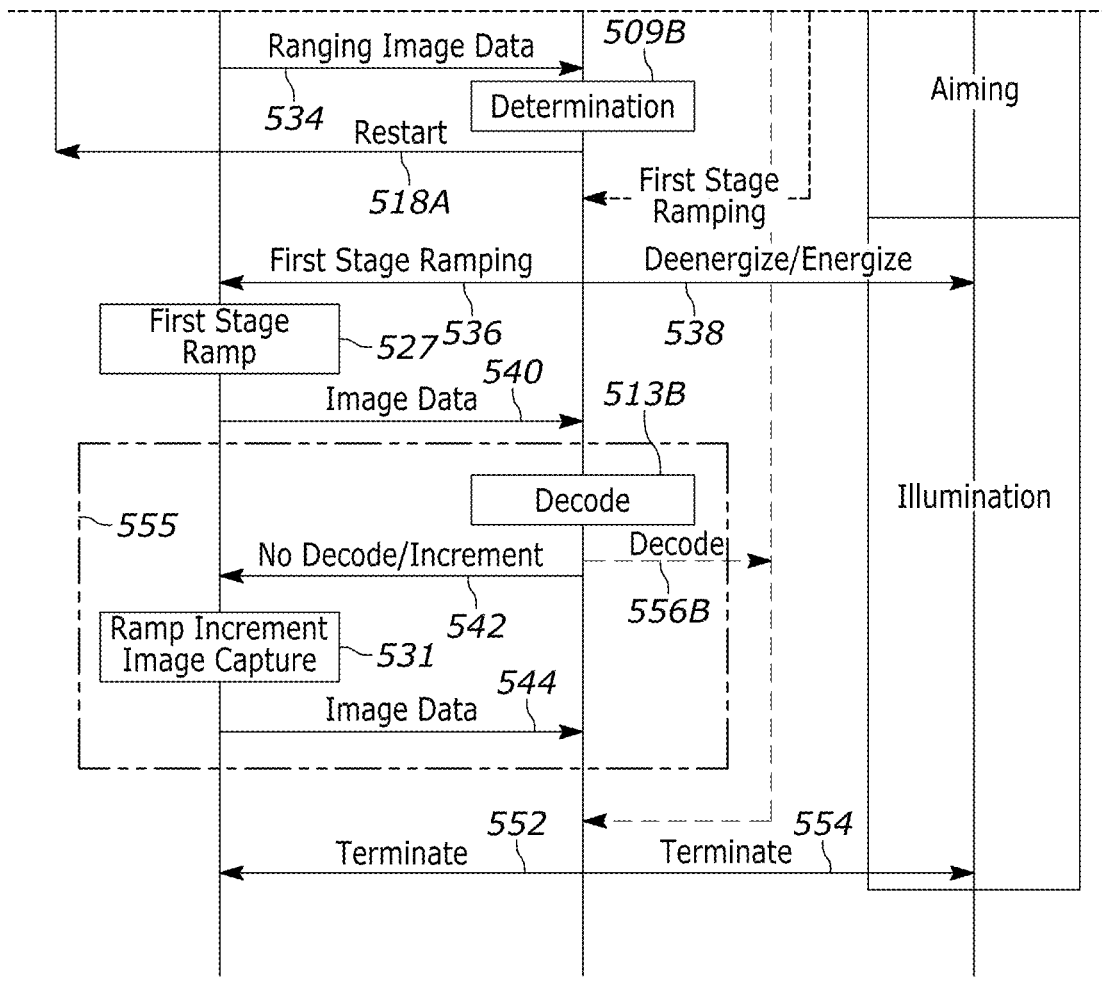

Referring next to FIG. 5, in a scenario 500, an imaging system controller 505 communicates with an imaging {let's be consist in how we refer to 515. If this is an example of the imaging assembly 245, then call it an imaging assembly.} assembly 515 and light sources 525. In some implementations, the light sources 525 may include an aiming source (e.g., aiming light source 223) and an illumination light source (e.g., illumination light source 251 including a far field illumination light source and a near field illumination light source). Depending on the implementation, some of the controller 505, imaging assembly 515 and/or light sources 525 may be components of the same device and messages as described below may be or include signals or other indications that are transmitted internally. In further implementations, each of the controller 505, imaging assembly 515 and light sources 525 are different devices and transmit messages between the devices.

In the scenario 500, the controller 505 initializes the scenario 500 by transmitting 502 a signal to the imaging assembly 515 to initiate a ranging operation 503, and also transmits 504 a signal to the light sources 525 to energize the aiming light source for the ranging operation 503. In some implementations, the controller 505 receives a signal to initiate the image acquisition process of scenario 500 when a user of the system (e.g., indicia reader 100, imaging system 200) engages a trigger of the indicia reader, such as trigger 110, upon detection of an object, such as a user or object to be scanned, at the system, or any other suitable signal.

The aiming light source is energized by the light sources 525 in response to transmission 504 at a time proximate the ranging operation 503, and provides a light beam, such as aiming pattern 330A, 330B for the ranging operation 503. In response to transmission 502, the imaging assembly 515 captures one or more images during the ranging operation 503, as previously discussed with respect to FIGS. 3A and 3B. The imaging assembly 515 transmits 506 the image data from the ranging operation 503 to the controller 505.

Upon receiving the image data from a ranging operation, such as ranging operations 503, 503A, 503B, the controller 505 attempts to determine 509, 509A, 509B distance information, which may also include determining a range value, focus parameters and/or illumination parameters (e.g., using LUT 350). With respect to ranging operation 503, if the controller 505 cannot determine 509 a distance based upon the transmission 506 from the imaging assembly 515, the controller 505 transmits 550 a signal to initiate a first stage ramping image capture operation 527, as further described herein.

If the controller 505 successfully determines 509 the distance, range value and focus parameters (e.g., from LUT 350) based upon the transmission 506, the controller 505 transmits 508 a signal of the determinations to the imaging assembly 515, which then carries out a fixed focus image capture operation 507. The controller 505 also determines 509 the illumination parameters based on the determined range value (e.g., from LUT 350) from the ranging operation 503, and transmits 510 a signal indicating the illumination parameters to light sources 525. In response to the transmission 510, the lights sources 525 illuminate the illumination source, as further described below. The transmission 510 also includes a signal to deenergize the aiming light source, as the ranging operation 503 is completed. While FIG. 5 depicts the aiming light source as being instructed to energize with transmission 504 and deenergize with transmission 510, the aiming light source may not be energized for the entire duration between these two transmissions 504, 510. For example, transmission 504 may including timing information, such that the aiming light source is only energized for a portion of time between transmissions 504, 510, such as during at least only portions of the ranging operation 503, outside of the ranging operation 503, or any other suitable timing. In such an example, the aiming light source may already be deenergized when light sources 525 receive transmission 510. Accordingly, the depiction of the aiming light source being energized throughout FIG. 5 is for illustration purposes only, and may vary in other implementations and examples, especially as depicted with respect to the aiming light source being deenergized/energized for a ranging operation, such as ranging operations 503, 503A, 503B, etc.

In response to the transmission 510, light sources 525 energize the illumination light source (e.g., the far field LED or near field LED) according to an illumination intensity associated with the range value determined by the controller 505 from ranging operation 503, e.g., according to illumination parameters associated with the range value according to LUT 350. Once energized, the illumination light source may illuminate the object proximate the time of the fixed focus capture operation 507 using the illumination intensity of the illumination parameters. The illumination from the energized illumination light source may provide proper exposure of the object and/or indicia for capturing images during the subsequent fixed focus image capture operation 507.

During the fixed focus image capture operation 507, the imaging assembly 515 uses the focus parameters of transmission 508 when capturing one or more images comprising image data of the object having an indicia located thereupon, and within the FOV of the system. Upon completion of the fixed focus image capture operation 507, the imaging assembly 515 transmits 512 the image data from the fixed focus image capture operation 507 to the controller 505. Although FIG. 5 depicts in the scenario 500 the imaging assembly 515 capturing and transmitting the image data of the one or more images captured at various times in the same message (e.g., transmissions 506, 512, 520, 526, etc.), the imaging assembly 515 may alternatively capture each image separately and transmit the associated image data separately, capture and/or transmit less than all the images and image data separately, or any combination thereof.

Next, the controller 505 attempts to decode 513 the indicia, such as a barcode, in the image data of transmission 512. Upon a successful decode 513, the controller 505 may transmit 556 a signal, which results in transmission 552 of a termination signal to the imaging assembly 515 and transmission 554 of a termination signal to light sources 525, ending the scenario 500. In some implementations, the termination indications may result in the light sources 525 deenergizing as a result of the transmission 554, and/or the imaging assembly initializing to focus parameters which may be indicated in the transmission 552.

If the controller 505 does not successfully decode 513 indicia from the image data, the controller 505 may transmit 514 a signal to the imaging assembly 515 indicating there was not a successful decode, and accordingly instruct the imaging assembly 515 to initiate a second ranging operation 503A. The second ranging operation 503A may operate similarly to the first ranging operation 503, i.e., to detect the distance between the indicia reader and the object, as the distance may have changed between the first ranging operation 503 and second ranging operation 503A.

If the controller 505 does not successfully decode 513 indicia from the image data of transmission 512, the controller also transmits 516 a signal to the light sources 525 to energize the aiming light source proximate the second ranging operation 503A, as was similarly done with transmission 504. The transmission 516 may also indicate the light sources 525 deenergize the illumination light source, e.g., as a result of the completion of the fixed focus image capture operation 507. Similar to the aiming light source, while FIG. 5 depicts the illumination light source as being instructed to energize via transmission 510 and deenergize via transmission 516, the illumination light source may not be energized for the entire duration between these two transmissions 510, 516. For example, transmission 510 may including timing information, such that the illumination light source is only energized for a portion of time between transmissions 510, 516, such as during at least only portions of the fixed focus image capturing operation 507, outside of the fixed focus image capturing operation 507, or any other suitable timing. In such an example, the illumination light source may already be deenergized when light sources 525 receives transmission 516. Accordingly, the depiction of the illumination light source in FIG. 5 is for illustration purposes only and may vary in other implementations and examples, especially as depicted with respect to the illumination light source being deenergized/energized for an image capture operation, such as image capture operations 507, 519, 503A, etc.

In response to transmission 514, the imaging assembly initiates the second ranging operation 503A. As with the first ranging operation 503, the imaging assembly 515 captures one or more images during the ranging operation 503A. The imaging assembly 515 transmits 520 the image data from the ranging operation 503A to the controller 505.

If the controller 505 cannot determine 509A a distance based upon the transmission 520 from ranging operation 503A, the controller 505 transmits 550A a signal to initiate a first stage ramping image capture operation 536.

If the second range operation 503A determination 509A indicates the distance between the indicia reader and the object has changed since the first ranging operation 503, the scenario 500 may restart from the beginning according to the controller 505 transmission 518, i.e., restarting the sequence 500 with the controller 505 issuing signals 502, 504 when suitable.

If the controller 505 successfully determines 509A the distance, and the distance remains the same as the previous distance determination 509, the controller also determines 509A the range value and focus parameters (e.g., from LUT 350) based upon the transmission 520. The controller 505 transmits 522 a signal of the determinations to the imaging assembly 515, which then carries out a bracketing focus image capture operation 519, i.e., capturing a plurality of images throughout a focal zone, as described with respect to FIG. 3C. As with the fixed focus image capture operation 507, the bracketing focus image capture operation 519 includes the controller 505 transmitting 524 a signal to light sources 525. The transmission 524 indication instructs the light sources 525 to deenergize the aiming light source proximate the completion of the second ranging operation 503A. The transmission 524 also includes illumination parameters which instruct the light sources 525 to energize an appropriate illumination source (e.g., the near field LED or far field LED) according to an illumination intensity associated the range value from ranging operation 503A. The light sources 525 may energize the illumination light source based on transmission 524 proximate the bracketing focus image capture operation 519.

The imaging assembly 515 may transmit 526 image data from the plurality of images captured during the bracketing focus image capture operation 519 to the controller 505 to decode 513A an indicia located in the image data. Upon a successful decode 513A, the controller 505 may transmit 556A a signal, which results in a transmission 552 of a termination signal to the imaging assembly 515 and transmission 554 of a termination signal to light sources 525 respectively, ending the scenario 500 as previously discussed. If the controller 505 does not successfully decode 513A indicia from the image data, it may transmit 528 a signal to the imaging assembly 515 to conduct a third ranging operation 503B. The third ranging operation 503B is similar to the first 503 and second 503A ranging operations.

If the controller 505 does not successfully decode 513A indicia from the image data of transmission 526, the controller also transmits 530 a signal to the light sources 525 to energize the aiming light source proximate the third ranging operation 503B, as was similarly done with transmissions 504, 516. The transmission 530 may also indicate the light sources 525 deenergize the illumination light source, e.g., as a result of the completion of the bracketing focus image capture operation 519.

In response to transmission 528, the imaging assembly 515 initiates the third ranging operation 503B. As with the other ranging operations 503, 503A, the imaging assembly 515 captures one or more images during the ranging operation 503B. The imaging assembly 515 transmits 534 the image data from the ranging operation 503B to the controller 505.

If the controller 505 cannot determine 509B a distance based upon the transmission 534 from ranging operation 503B, the controller 505 transmits 536 a signal for the system to initiate a first stage ramping image capture operation 527 using focus parameters associated with an unknown distance and range value, as previously described.

If the controller 505 successfully determines 509B the distance between the indicia reader and the object has changed since the second ranging operation 503A, the scenario 500 may restart from the beginning according to the controller 505 transmission 518A, i.e., restarting the sequence 500 with the controller 505 issuing signals 502, 504, similar to indication 518.

If the controller 505 successfully determines 509B the distance from transmission 534, and the distance remains the same as the previous distance determination 509A, the controller also determines 509B the range value and focus parameters (e.g., from LUT 350) based upon the transmission 534. Next, the controller 505 transmits 536 a signal of the determinations to the imaging assembly 515, which then carries out a first stage ramping image capture operation 527. As with the fixed focus image capture operation 507 and the bracketing focus image capture operation 519, the first stage ramping image capture operation 527 may include the controller 505 transmitting 538 a signal to light sources 525. The indication instructs the light sources 525 to deenergize the aiming light source proximate the completion of the third ranging operation 503B, and also includes illumination parameters which instruct to energize an appropriate illumination source (e.g., the near field LED or far field LED) according to an illumination intensity associated with the range value from ranging operation 503B, which may include illumination parameters for an unknown range value as previously described. The light sources 525 may energize the illumination light source based on transmission 538 proximate the first stage ramping image capture operation 527.

As a result of the system being unable to successfully decode 513, 513A an indicia after the fixed focus image capture operation 507 and the bracketing focus image capture operation 519, respectively, and after the controller 505 determines 509B the distance has not changed, the imaging assembly 515 enters a first stage ramping image capture operation 527. The ramping image capture operations 527, 531 may include capturing a plurality of images at various focal distances/across sequential focal zones, as previously described. In at least some embodiments, the focal distances may incrementally increase or decrease throughout various focal distances, resulting in the imaging assembly 515 capturing images across the entire range of focal distances (unless terminated) in an attempt to obtain a clear image of the indicia to successfully decode 529 the indicia.

Proximate entering the first stage ramping image capture operation 527, the light sources 525 may energize the illumination light source (e.g., the near field LED or far field LED) according to an illumination intensity associated with the illumination parameters from transmission 538 from the controller 505. The illumination intensity provided by the light sources 525 may remain substantially constant throughout at least a majority of the first stage ramping image capture operation 527 and/or incremental ramping image capture operation 531. Providing constant illumination during ramping operations 527, 531, rather than different illumination intensities at various steps of the ramping operations 527, 531, provides several technical benefits including, but not limited to, providing a level of exposure of the object and/or indicia in the image data beneficial to decoding the indicia. Another benefit provides thermal efficiencies of the illumination assembly and thus system, associated with the power consumption of the indicia reader remaining constant rather than fluctuating through one or more lights sources at one or more intensities. Also, when ramping through various illumination intensities during ramping operations 527, 531, the user of the system may experience a flickering effect from the light sources 525, which may prove distracting, annoying and/or inconvenient. Such a flickering effect would likewise be reduced, if not eliminated, by the constant illumination during the ramping operations 527, 531.

The ramping operations 527, 531 may be ramped and incremented throughout steps of various focal distances. During each step of the ramping operations 527, 531 having an associated focal distance, the imaging assembly may capture one or more images containing image data, which it transmits to the controller 505 for indicia decoding. For example, during the first stage ramping image capture operation 527, the imaging assembly 505 may start at a first ramping step equivalent to imaging an object indicated at 3 inches from the indicia reader based a ranging operation. The imaging assembly 515 determines the range value associated with three (3) inches, sets a focal distance associated with the range value, and captures multiple images at that focal distance. The imaging assembly may transmit 540 the image data 540 to the controller 505 to decode 513B the image data from the first ramping step. If an indicia is successfully decoded 513B, the sequence 500 ends with the controller 505 initiating a transmission 556B which results in transmissions 552, 554 indicating termination to the imaging assembly 515 and light sources 525 respectively, as previously described.

If there is no successful decode 513B, the ramping sequence enters a ramp incrementing loop 555. While in the loop 555, the controller 505 transmits a signal 542 to the imaging assembly 515 to ramp to the next, incremented step in the incremental ramping image capture operation 531. This includes ramping the focal distance to a next value associated with the incremented step, whether that includes increasing or decreasing the focal distance as the incremental ramping image capture operation 531 may include either as a next step, i.e., whether ramping down versus ramping up as previously described. The imaging assembly 515 then captures one or more images associated with the incremented step, transmits 544 the image data from the images of the incremented step for subsequent decoding 513B by the controller 505. Incrementing the ramping operation to the next step may be repeated ad infinitum in the ramp incrementing loop 555, until a successful decode 516B from one or more images at one or more steps, resulting in transmission 556B. In some implementations, the sequence 500 exits the loop 55 when the controller 505 transmits 552, 554 termination indications, e.g., as a result of the user releasing the trigger of the indicia reader, or any other suitable reason.

In some implementations, when a distance and/or range value cannot be determined from any one of the ranging operations 503, 503A, 503B, the controller 505 provides illumination parameters to light sources 525 instructing to energize one or more sources of illumination at an intensity which is associated with an unknown distance and/or range value, and continue with an initial first stage ramping image capture operation 527 followed by a loop of incremental ramping image capture operations 531 if there is no successful decode 513B, or other indication to end the sequence 500. For example, when the distance between an object and the indicia reader is unknown to the system, the controller may transmit 538 a signal to light sources 525 of illumination parameters for an unknown distance/range value which energize the near field LED at full intensity through the ramping operations 527, 531. These illumination parameters may provide a level of illumination of the FOV of the indicia reader resulting in a level of exposure of an indicia which may increase the chances of a successful decode 513B of image data 540, 544 at a range of distances.

While the exemplary sequence 500 depicts the range value is described as being determined by the controller 505 imaging assembly 515, this is for illustration purposes only. In some implementations, imaging assembly 515 may determine the range value, or any other controller, processor, or suitable component associated with the system.

Figure 6A:
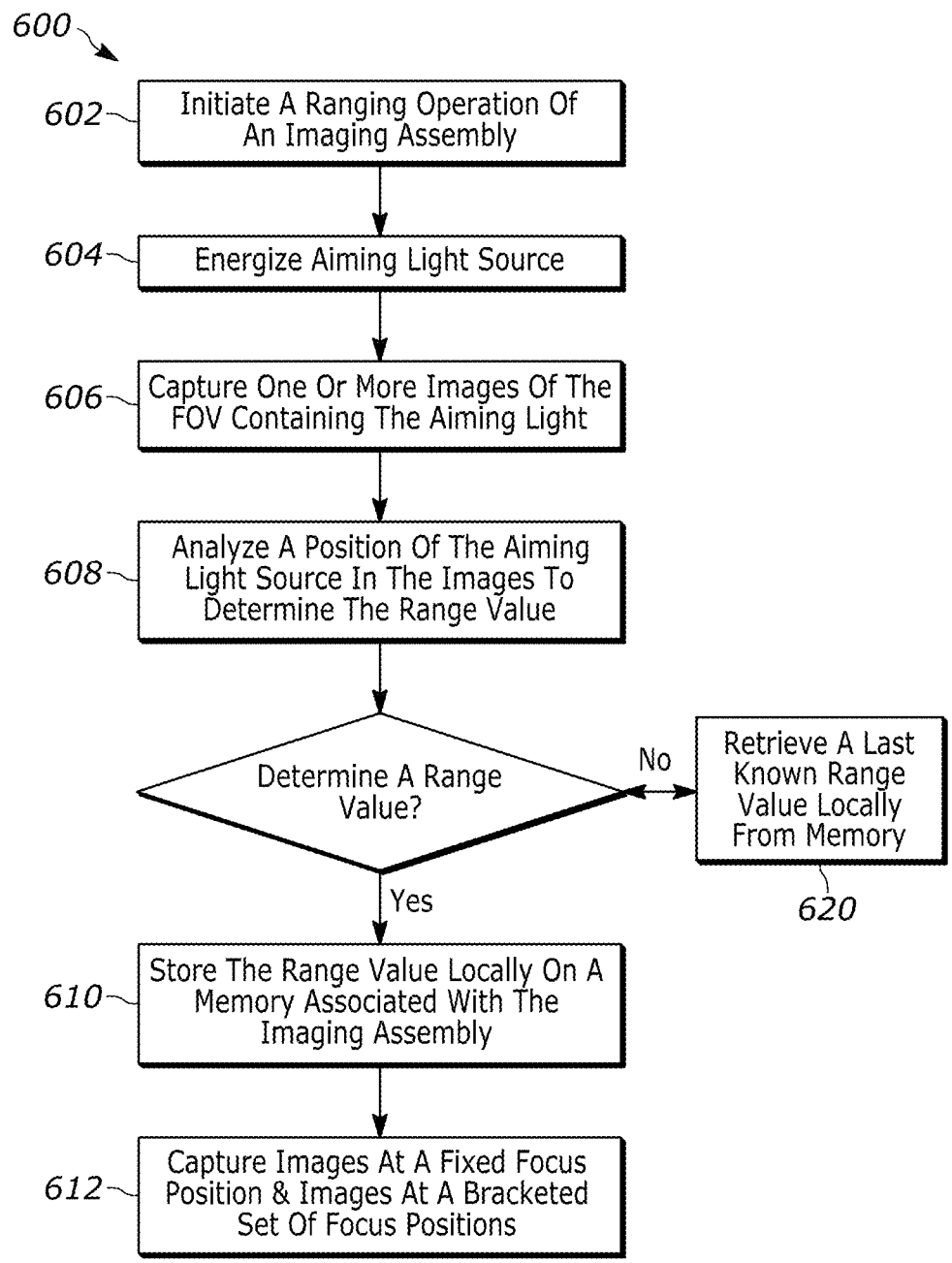
FIGS. 6A and 6B illustrate a flow diagram of an example method for providing illumination during operation of an indicia reader according to the techniques described herein.
Figure 6B:
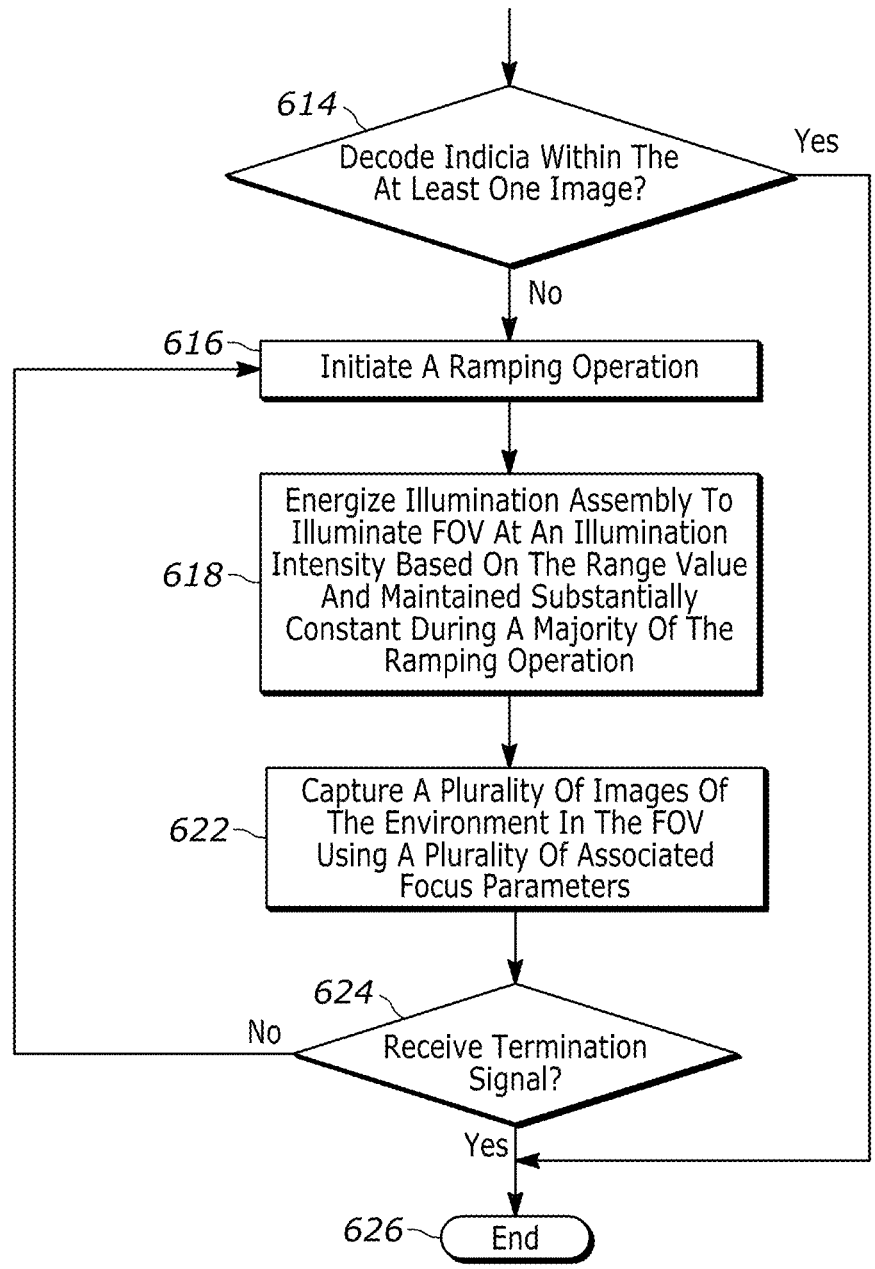

Referring next to FIGS. 6A and 6B, the method 600 illustrates a flow diagram of an example method for providing illumination during operation of an indicia reader, such as indicia reader 100. Although the method 600 is described below with regard to controller 505, imaging assembly 515 and components of light sources 525 (i.e., illumination light source, near field light source and far field light source, and aiming light source) as described with regard to FIG. 5, it will be understood that other similarly suitable imaging devices and/or components may be used instead (e.g., imaging device 200, etc.).

The method 600 includes at block 602 initiating a ranging operation of an imaging assembly having a FOV. Depending on the implementation, initiating the ranging operation 602 may be responsive to receiving a command (e.g., signal) from a controller, such as controller 505. For example, a user may engage the trigger of an indicia reader, such as trigger 110 of indicia reader 100, and as a result the controller generates a command to initiate a ranging operation. In other implementations, the imaging assembly may automatically begin the ranging operation responsive to an object (e.g., an item with an indicia for decoding, a user of the indicia reader, etc.) entering a FOV of the imaging assembly, receiving an input from a user via user interface, etc.

The ranging operation may include at block 604 energizing an aiming light source, such as aiming LED 223. The aiming light source may be configured to project an aiming light into the FOV. At block 606 the method 600 may further include capturing, by the imaging assembly, one or more images comprising image data of the FOV containing the aiming light source. Block 608 may include analyzing a position of the aiming light source in the one or more images captured in block 606 to determine the range value. For example, the aiming light source may project a pattern into an imaging region in the FOV, as described with respect to FIGS. 3A and 3B, from which a distance between an object and the indicia reader, as well as a range value, may be determined, e.g., by the controller. The method 600 may further include at block 610 storing the range value locally on a memory, such as memory 260, associated with the imaging assembly.

At least subsequent to determining the range value and prior to initiating a ramping operation, the method 600 may include at block 612 capturing at least one image by the imaging assembly. This may include capturing a first set of one or more images at a fixed focus position and capturing a second set of multiple images at a bracketed set of focus positions around the fixed focus position. At block 614, a decoder may attempt to decode an indicia contained within the image of captured images. Responsive to not successfully decoding an indicia contained within the at least one image, the method at block 616, may include initiating the ramping operation. Responsive to successfully decoding an indicia contained within the at least one image, the method at block 626 ends.

The ramping operation may include at block 618 energizing an illumination assembly, such as the illumination assembly of FIG. 2, to provide illumination of the FOV during the ramping operation, wherein an illumination intensity is determined based upon the range value and wherein the illumination intensity is maintained substantially constant during at least a majority of the ramping operation. Based upon the range value, the system may determine illumination parameters as described earlier, e.g., by using a LUT such as LUT 350, or calibration table. In some implementations, the range value may be associated with a distance based on a ranging operation. In other implementations where the distance may be unknown, the range value may be associated with the unknown distance. The illumination assembly may include at least one near field illumination source and at least one far field illumination source. In some implementations, only one of the illumination sources is energized at any one time, e.g., based on the illumination parameters. The illumination assembly may be energized, e.g., via one or more of the illumination sources, to an illumination intensity, e.g., based on the illumination parameters. In one example, the range value may be associated with illumination parameters which indicate the near field illumination source is energized to full power or full illumination intensity, and in another example, the far field light source is energized to half power or half illumination intensity. During at least a majority of the ramping operation, the illumination intensity may be maintained substantially constant. For example, the illumination intensity may be maintained by an illumination light source for the entire ramping operation. The illuminated FOV may provide appropriate lighting conditions which benefit capturing one or more images of the indicia with an exposure enabling decoding of the indicia.

In some implementations, the range value may determine an associated illumination intensity. If the range value cannot be determined, e.g., if a user is waiving around the imaging device while engaging the trigger such that a ranging operation cannot determine a distance and associated range value, the method 600 may include at block 620 retrieving a last known range value locally from a memory associated with the imaging assembly. For example, the range value stored in memory at block 610.

The ramping operation may include initiating a ramping sequence for the imaging assembly, wherein at block 622 the imaging assembly captures a plurality of images comprising image data of an environment appearing in the FOV using an associated plurality of focus parameters. The plurality of focus parameters may define a plurality of different focal zones, such that the ramping sequence generates image data at each of the plurality of focal zones, as described with respect to FIG. 5 during the ramp looping 555. In some implementations, the plurality of focus parameters include focus parameters defining a first plurality of focal zones corresponding to the at least one near field illumination source (e.g., the near field LED) and a second plurality of focal zones corresponding to the at least one far field illumination source (e.g., the far field LED). In such implementations, the ramping sequence may generate image data at each of the plurality of focal zones and/or at each of the second plurality of focal zones.

At block 624, the method 600 may include terminating the ramping operation based upon the controller receiving a termination signal. In some implementations, the decoding module decodes image data from at least one image of the plurality of images to decode an indicia contained within the at least one image. In response to decoding the indicia, the decoding module may generate the termination signal which it provides to the controller. The controller may then at block 624 issue a command to end the method 600, e.g., via a command to the imaging assembly and illumination assembly. In some implementations, the user may disengage the trigger of the indicia decoder, and as a result the controller generates a command to terminate the ranging operation of method 600. If no termination signal is received, the method 600 at block 624 may return back to block 616 to again initiate the ramping operation. The method my repeatedly loop from block 624 to block 616 ad infinitum should no termination signal be received each time block 624 is reached.

It will be understood that the foregoing represents one potential implementation, and that other implementations may be envisioned. For example, in some implementations, a bi-optic barcode scanner may be used as the imaging device.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . aa", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A method for providing illumination during operation of an indicia reader, the method comprising:
   initiating a ranging operation of an imaging assembly having a field of view;
   based on the ranging operation, determining a range value associated with a distance between the imaging assembly and an object in the field of view;
   initiating a ramping operation via a controller, the ramping operation comprising:
      initiating a ramping sequence for the imaging assembly, wherein the imaging assembly captures a plurality of images comprising image data of an environment appearing in the field of view using an associated plurality of focus parameters; and
      energizing an illumination assembly to provide illumination of the field of view during the ramping operation, wherein an illumination intensity is determined based upon the range value and wherein the illumination intensity is maintained substantially constant during at least a majority of the ramping operation; and
   terminating the ramping operation based upon the controller receiving a termination signal.

2. The method of claim 1, further comprising;
   capturing, at least subsequent to determining the range value and prior to initiating the ramping operation, at least one image by the imaging assembly; and
   responsive to not successfully decoding an indicia contained within the at least one image by a decoding module, initiating the ramping operation.

3. The method of claim 2, wherein the at least one image captured by the imaging assembly subsequent to determining the range value and prior to initiating the ramping operation includes a first set of one or more images captured at a fixed focus position and a second set of multiple images captured at a bracketed set of focus positions around the fixed focus position.

4. The method of claim 1, wherein the ranging operation comprises:
   energizing an aiming light source configured to project an aiming light into the field of view;
   capturing, by the imaging assembly, one or more images comprising image data of the field of view containing the aiming light;
   analyzing a position of the aiming light in the one or more images to determine the range value; and
   storing the range value locally on a memory associated with the imaging assembly.

5. The method of claim 1, wherein the ranging operation comprises:
   retrieving a last known range value locally from a memory associated with the imaging assembly.

6. The method of claim 1, wherein the plurality of focus parameters comprise focus parameters defining a plurality of different focal zones, the ramping sequence generating image data at each of the plurality of focal zones.

7. The method of claim 1, wherein the illumination assembly includes at least one near field illumination assembly and at least one far field illumination assembly.

8. The method of claim 7, wherein the plurality of focus parameters comprise focus parameters defining a first plurality of focal zones corresponding to the at least one near field illumination assembly and a second plurality of focal zones corresponding to the at least one far field illumination assembly, the ramping sequence generating image data at each of the plurality of focal zones and/or at each of the second plurality of focal zones.

9. The method of claim 1, wherein terminating the ramping operation based upon receiving the termination signal further comprises:
   providing the image data from at least one image of the plurality of images to a decoding module;
   analyzing the image data from the at least one image of the plurality of images by the decoding module to decode an indicia contained within the at least one image; and
   responsive to decoding the indicia contained within the at least one image, generating the termination signal to provide to the controller.

10. A system for providing illumination during operation of an indicia reader, the system comprising:
   an imaging assembly having a field of view;
   a controller;
   one or more processors; and
   a memory associated with the particular indicia reader scanner storing instructions that, when executed by the one or more processors, cause the one or more processors to:
      initiate a ranging operation;
      based on the ranging operation, determine a range value associated with a distance between the imaging assembly and an object in the field of view;
      initiate a ramping operation, wherein the ramping operation comprises the one or more processors configured to:
         initiate a ramping sequence for the imaging assembly, wherein the imaging assembly captures a plurality of images comprising image data of an environment appearing in the field of view using an associated plurality of focus parameters; and energize an illumination assembly to provide illumination of the field of view during the ramping operation, wherein an illumination intensity is determined based upon the range value and wherein the illumination intensity is maintained substantially constant during at least a majority of the ramping operation; and terminate the ramping operation based upon the controller receiving a termination signal.

11. The system of claim 10, wherein the ranging operation comprises the one or more processors configured to:

energize an aiming light source configured to project an aiming light into the field of view;

capture one or more images comprising image data of the field of view containing the aiming light;

analyze a position of the aiming light in the one or more images to determine the range value; and store the range value locally on a memory associated with the imaging assembly.

12. The system of claim 10, wherein the ranging operation comprises the one or more processors configured to:

retrieve a last known range value locally from a memory associated with the imaging assembly.

13. The system of claim 10, wherein the plurality of focus parameters comprise focus parameters defining a plurality of different focal zones, the ramping sequence generating image data at each of the plurality of focal zones.

14. The system of claim 10, wherein the illumination assembly includes at least one near field illumination assembly and at least one far field illumination assembly.

15. The system of claim 14, wherein the plurality of focus parameters comprise focus parameters defining a first plurality of focal zones corresponding to the at least one near field illumination assembly and a second plurality of focal zones corresponding to the at least one far field illumination assembly, the ramping sequence generating image data at each of the plurality of focal zones and/or at each of the second plurality of focal zones.

16. The system of claim 10, wherein to terminate the ramping operation based upon receiving the termination signal, the one or more processors are further configured to:

provide the image data from at least one image of the plurality of images to a decoding module;

analyze the image data from the at least one image of the plurality of images by the decoding module to decode an indicia contained within the at least one image; and responsive to decoding the indicia contained within the at least one image, generate the termination signal to provide to the controller.

17. A tangible machine-readable medium comprising instructions that, when executed, cause a machine to at least:

initiate a ranging operation of an imaging assembly having a field of view;

based on the ranging operation, determine a range value associated with a distance between the imaging assembly and an object in the field of view;

initiate a ramping operation via a controller, the ramping operation comprising instructions that, when executed, cause the machine to at least:

initiate a ramping sequence for the imaging assembly, wherein the imaging assembly captures a plurality of images comprising image data of an environment appearing in the field of view using an associated plurality of focus parameters; and energize an illumination assembly to provide illumination of the field of view during the ramping operation, wherein an illumination intensity is determined based upon the range value and wherein the illumination intensity is maintained substantially constant during at least a majority of the ramping operation; and terminate the ramping operation based upon the controller receiving a termination signal.

18. The tangible machine-readable medium of claim 17, further comprising instructions that, when executed, cause a machine to at least:

capture, at least subsequent to determining the range value and prior to initiating the ramping operation, at least one image by the imaging assembly; and responsive to not successfully decoding an indicia contained within the at least one image by a decoding module, initiate the ramping operation.

19. The tangible machine-readable medium of claim 18, wherein the at least one image captured by the imaging assembly subsequent to determining the range value and prior to initiating the ramping operation includes a first set of one or more images captured at a fixed focus position and a second set of multiple images captured at a bracketed set of focus positions around the fixed focus position.

20. The tangible machine-readable medium of claim 17, further comprising instructions that, when executed, cause a machine to at least:

retrieve a last known range value locally from the memory associated with the imaging assembly; or energize an aiming light source configured to project an aiming light into the field of view;

capture, by the imaging assembly, one or more images comprising image data of the field of view containing the aiming light;

analyze a position of the aiming light in the one or more images to determine the range value; and store the range value locally on a memory associated with the imaging assembly.

* * * * *